Dec. 11, 1962 G. GRUNWALDT 3,068,368
MULTISTABLE TRIGGER ARRANGEMENT
Filed Sept. 29, 1960
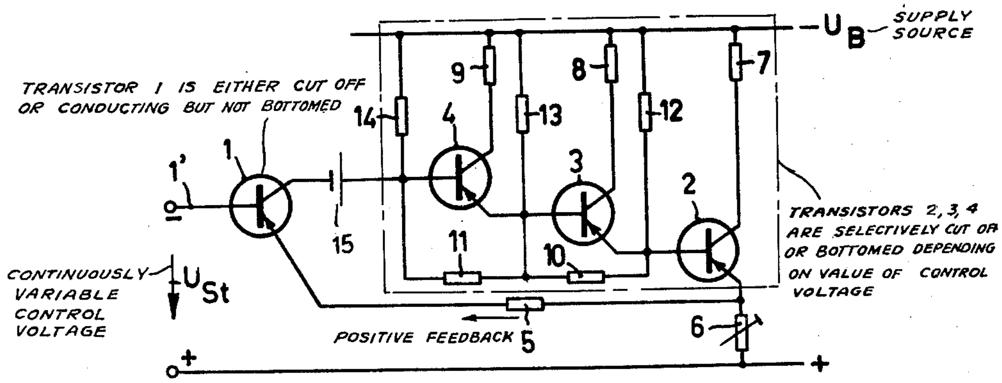
INVENTOR
GOTTFRIED GRUNWALDT
BY
Frank R. Jeifari
AGENT United States Patent Office 3,068,368
Patented Dec. 11, 1962

3,068,368
MULTISTABLE TRIGGER ARRANGEMENT
Gottfried Grunwaldt, Hamburg, Germany, assignor to North American Philips Company, Inc., New York, N.Y., a corporation of Delaware
Filed Sept. 29, 1960, Ser. No. 59,232
Claims priority, application Germany Oct. 2, 1959
4 Claims. (Cl. 307—88.5)

This invention relates to multistable trigger arrangements. Known is a tristable threshold switch having three transistors, in which the bases of two transistors are controllable by direct voltages and the emitters of all the transistors are connected together. In many uses, for example, for control purposes, it is desirable to use a continuously variable measuring quantity so that a discrete number of constant control operations are effected thereby; the number of operations is in general more than three.

In principle, it would be possible to construct a multistable switch on the basis of the known tristable threshold switch. However, the present invention provides a simpler and more advantageous arrangement. According to the invention, the transistors are connected in cascade and follow a control transistor operated in grounded-emitter arrangement. Each cascade-connected transistor is connected to the base of the following transistor via the emitter of the preceding transistor; the emitter of the control transistor is connected to the emitter of the last of the cascade-connected transistors, the latter being connected to a resistor. Resistors, preferably of determined and different values, are connected in parallel with the base-emitter path of each of the remaining cascade-connected transistors and the terminals of these resistors are connected to the negative terminal of the operating voltage via further resistors.

The advantage of the new multistable trigger arrangement according to the invention consists in that the number of stable states, which corresponds to the number of transistors used, may be increased or decreased at will without increasing the costs.

In order that the invention may be readily carried into effect, one embodiment of the multistable trigger circuit arrangement of the invention will now be described, by way of example, with reference to the accompanying drawing, in which 1 is a control transistor, 2, 3 and 4 are the cascade-arranged transistors, the emitter of each transistor of the cascade except the last one being conductively connected to the base of the following transistor. The base of the transistor 4 is connected to the collector of the control transistor 1 via an auxiliary voltage source 15. The emitters of the transistors 1 and 2 are interconnected via a resistor 5 and a variable resistor 6 is connected between the emitter of the transistor 2 and the positive terminal of a source of supply voltage $U_B$. Each of the transistors 2, 3 and 4 has a separate collector resistor 7, 8 and 9, respectively, connected to the negative terminal of the source $U_B$, while the base-emitter path of each of the transistors 3 and 4 is connected in parallel with the resistors 10 and 11, respectively, which are preferably of predetermined and different values. The references 12, 13 and 14 indicate the base resistors. The auxiliary voltage source 15 insures that a collector-emitter voltage is always applied to the transistor 1, so that its current amplification is always effective.

In the known transistor trigger circuit arrangements, the transistors are always either entirely cut off or so strongly conductive that their collector currents are determined only by the collector load resistance and their collector-emitter voltages have dropped to the saturation or bottoming value (knee voltage). In the circuit arrangement of the invention described above, this is the case only for the transistors 2, 3 and 4. The control transistor 1, which receives a control voltage $U_{st}$ applied to the base 1′, conducts currents of different values in the different stable states of the arrangement and is never so strongly conductive that its collector current is determined by the collector load resistance. The different stable states are: (1) all the transistors 2, 3 and 4 are cut off; (2) only the transistor 2 is conductive; (3) the transistors 2 and 3 are conductive; and (4) all the transistors 2, 3 and 4 are conductive.

Characteristic of the multistable trigger arrangement is that the transistors 2, 3 and 4 which, as stated, may also be provided in larger numbers, are connected to each other in cascade arrangement, that is to say that the base of each transistor except the last is connected to the emitter of the following one.

If the influence of the collector and emitter currents of the transistor 1 is neglected, each of the transistors 2, 3 and 4 is supplied with a base current at least equal to the current flowing through the corresponding resistor 12, 13 or 14. Each of these currents is larger than the minimum base current required for reaching the knee voltage of the corresponding transistor.

Assuming that the base of the control transistor 1 is at the potential of the positive terminal of the supply source $U_B$, the transistor 1 is cut off and the three transistors 2, 3 and 4 are conductive and bottomed. As regards the transistor 1, the auxiliary voltage 15 ensures that it is always supplied with a collector-emitter voltage.

When the base of the transistor 1 becomes more negative, due to an increase of the negative control voltage $U_{st}$, a collector current flows through the transistor 1. This collector current is subtracted from the base current for the transistor 4. At the instant the transistor 4 comes out of the bottomed condition, its current amplification becomes effective, the reduction of its emitter current brings about a corresponding reduction of the current through the resistor 6 and it is rapidly changed over into the cut-off state by the feedback coupling to the transistor 1 provided across the resistor 6 and via the resistor 5. The feed-back coupling should preferably be adjusted by means of the adjustable resistor 6 so as to be so strong that the base current variation caused by the changing over via this feedback coupling be at least as large as the base current required to bottom the transistor 4, i.e. to render it so strongly conductive that its collector current is determined by its external collector load resistance and that its collector-emitter voltage reaches the saturation or knee value.

If the control voltage $U_{st}$ is further increased, the collector of the transistor 1 begins to draw, via the resistor 11, part of the base current for the transistor 3. As a result, this transistor 3 is also abruptly switched over into the cut-off state. If the control voltage $U_{st}$ is still further increased, the collector of the transistor 1 finally also draws through the resistors 11 and 10, part of the base current for the transistor 2. This third further transistor 2 is also brought out of the bottomed condition and abruptly switched over into the cut-off state. When decreasing the control voltage $U_{st}$, the switching operations occur in a reverse direction, the control voltages at which the reverse triggering occurs being, however, somewhat smaller than the voltage values for the successive forward triggering operation described above.

The source resistance of the control voltage source has to be low with respect to the value of the resistor 5 as seen on the base input side of the transistor 1, in order that the feedback coupling be maximally effective for securing the successive switching operations.

As stated, the trigger circuit arrangement described can also be extended to provide more than four stable states. In that case, the transistor 4 is preceded by one or more additional transistors connected in the same manner in which, for example, the transistor 3 is preceded by the transistor 4 in the embodiment described.

The following is an illustrative example of circuit values for a circuit arrangement tested in practice:

| | |
|---|---|
| $U_B$ | 12 v. |
| Voltage 15 | 6 v. |
| Transistor 1 | OC71 |
| Resistors 7–9 | 560Ω |
| Resistor 10 | 680Ω |
| Resistor 6 | 25Ω |
| Transistors 2–4 | OC76 |
| Resistors 12–14, each | 4.7 KΩ |
| Resistor 11 | 470Ω |
| Resistor 5 | 100Ω |

What is claimed is:

1. A multistable trigger circuit arrangement including a first transistor having base-, emitter- and collector-electrodes, a series of further transistors each having base-, emitter- and collector-electrodes, a pair of input terminals for applying a variable control voltage, a source of operating voltage having one terminal conductively connected to one of said input terminals and another terminal coupled to the collector- and base-electrodes of each of the said further transistors through individual collector- and base-resistors respectively, the base-electrode of said first transistor being conductively connected to the other of said input terminals, the collector-electrode of said first transistor being conductively connected to the base-electrode of the first transistor of said series, the emitter of said first transistor being coupled to the emitter of the last transistor of said series through a feedback resistor, the transistors of said series being connected in cascade with the base-electrode of each transistor of said series but the first being conductively connected to the emitter of the preceding transistor of the series, the emitter of the last transistor of the series being connected to said one terminal of said source of operating voltage through an emitter load-resistor and the emitters of the other transistors of the series being connected to their respective base-electrodes through individual emitter-base resistors.

2. A multistable trigger circuit arrangement including a first transistor having base-, emitter- and collector-electrodes, a series of further transistors each having base-, emitter- and collector-electrodes, a pair of input terminals for applying a variable control voltage, a source of operating voltage having one terminal conductively connected to one of said input terminals and another terminal coupled to the collector- and base-electrodes of each of the said further transistors through individual collector- and base-resistors respectively, the base-electrode of said first transistor being conductively connected to the other of said input terminals, the collector-electrode of said first transistor being conductively connected to the base-electrode of the first transistor of said series through an auxiliary source of reverse collector-voltage, the emitter of said first transistor being coupled to the emitter of the last transistor of said series through a feedback resistor, the transistors of said series being connected in cascade with the base-electrode of each transistor of said series but the first being conductively connected to the emitter of the preceding transistor of the series, the emitter of the last transistor of the series being connected to said one terminal of said source of operating voltage through an emitter load-resistor and the emitters of the other transistors of the series being connected to their respective base-electrodes through individual emitter-base resistors.

3. A circuit according to claim 1, wherein said emitter load resistor is adjustable.

4. A circuit according to claim 2, wherein said emitter load resistor is adjustable.

References Cited in the file of this patent

UNITED STATES PATENTS

| | | |
|---|---|---|
| 2,488,314 | Moore | Nov. 15, 1949 |
| 2,810,072 | Amatniek | Oct. 15, 1957 |
| 2,864,904 | Jensen | Dec. 18, 1958 |
| 2,903,604 | Henle | Sept. 8, 1959 |